United States Patent
Renna

(10) Patent No.: US 7,214,397 B1
(45) Date of Patent: May 8, 2007

(54) PLUG FOR SUCKING A BEVERAGE

(76) Inventor: Egidio Renna, Via A. Scarlatti, 211/E, Napoli (IT) I-80127

( * ) Notice: Subject to any disclaimer, the term of this patent is extended or adjusted under 35 U.S.C. 154(b) by 228 days.

(21) Appl. No.: 10/009,976

(22) PCT Filed: Jun. 14, 2000

(86) PCT No.: PCT/EP00/05467

§ 371 (c)(1),
(2), (4) Date: Apr. 12, 2002

(87) PCT Pub. No.: WO00/76327

PCT Pub. Date: Dec. 21, 2000

(30) Foreign Application Priority Data

Jun. 15, 1999 (IT) ............................. MI99A1325
Jun. 15, 1999 (IT) ............................. MI99A1326

(51) Int. Cl.
*A23G 3/56* (2006.01)
*A23G 3/50* (2006.01)
(52) U.S. Cl. .................. 426/132; 426/85; 426/120; 426/134; 426/115; 426/104
(58) Field of Classification Search ............ 426/120, 426/104, 134, 132, 85, 115, 124
See application file for complete search history.

(56) References Cited

U.S. PATENT DOCUMENTS

| D69,277 | S | * | 1/1926 | Josephson | .................. D1/104 |
| 1,980,588 | A | * | 11/1934 | Hopp | ........................ 426/134 |
| 2,121,185 | A | * | 6/1938 | Claff | .......................... 426/104 |
| 2,417,480 | A | * | 3/1947 | Friedman | .................... 446/205 |
| 2,766,123 | A | * | 10/1956 | Moubayed | .................. 426/132 |
| 2,975,925 | A | * | 3/1961 | Chambers | .................. 215/387 |
| 3,146,904 | A | * | 9/1964 | Hansen et al. | ............. 215/11.1 |
| 3,255,691 | A | * | 6/1966 | Schwartz et al. | ............. 99/275 |
| 3,302,644 | A | * | 2/1967 | Kennedy et al. | ............. 604/78 |
| 3,463,361 | A | * | 8/1969 | Cook et al. | .............. 222/144.5 |
| 3,545,980 | A | * | 12/1970 | Stanger | ........................ 426/85 |
| 3,730,737 | A | * | 5/1973 | Harvey et al. | ............. 426/115 |
| 3,821,425 | A | * | 6/1974 | Russell | ........................ 426/110 |
| 3,978,233 | A | * | 8/1976 | Bolt | ............................ 426/115 |
| 4,229,482 | A | * | 10/1980 | Kreske, Jr. | .................. 426/134 |

(Continued)

FOREIGN PATENT DOCUMENTS

FR    2330327    *  7/1977

(Continued)

OTHER PUBLICATIONS

Landau U.S. Appl. No. 08/797,593.*

*Primary Examiner*—Steve Weinstein
(74) *Attorney, Agent, or Firm*—Young & Thompson

(57) ABSTRACT

A plug for sucking a beverage from a bottle or the like includes a housing and supporting means for housing and supporting a dissolvable food praline, the beverage being delivered through the plug through a window formed between the outer contour of the praline and the praline housing chamber and/or through at least a praline throughgoing hole. With a "teat" configuration of the plug top portion a sucking, in any desired dissolving degrees, of the praline, depending on the rubbing of a user's tongue on the praline and on the beverage suction, is thereby facilitated.

20 Claims, 17 Drawing Sheets

U.S. PATENT DOCUMENTS

| | | | | |
|---|---|---|---|---|
| 4,350,712 | A | * | 9/1982 | Kocharian et al. ........... 426/134 |
| 4,478,346 | A | * | 10/1984 | Spong ........................ 220/711 |
| 5,013,321 | A | * | 5/1991 | MacVane .................... 606/234 |
| 5,078,734 | A | * | 1/1992 | Noble .......................... 604/77 |
| 5,085,330 | A | * | 2/1992 | Paulin ........................... 215/6 |
| 5,085,335 | A | * | 2/1992 | Carbaugh ................... 220/709 |
| 5,104,008 | A | * | 4/1992 | Crisci .................... 222/153.07 |
| 5,180,079 | A | * | 1/1993 | Jeng ........................... 220/705 |
| 5,224,646 | A | * | 7/1993 | Biancosino ................... 229/4.5 |
| 5,312,014 | A | * | 5/1994 | Hamlin ....................... 220/703 |
| 5,324,527 | A | * | 6/1994 | Coleman .................... 426/134 |
| 5,328,063 | A | * | 7/1994 | Beck et al. ................. 222/524 |
| 5,370,884 | A | | 12/1994 | Coleman |
| 5,542,922 | A | * | 8/1996 | Petterson et al. ............. 604/77 |
| 5,635,229 | A | * | 6/1997 | Ray ........................... 426/112 |
| 5,820,437 | A | * | 10/1998 | Coleman et al. ............ 446/196 |
| 5,921,955 | A | * | 7/1999 | Mazer et al. ................. 604/83 |
| 5,984,141 | A | * | 11/1999 | Gibler ......................... 222/80 |
| 5,993,870 | A | | 11/1999 | Hoeting et al. |
| 6,024,012 | A | * | 2/2000 | Luzenberg, Jr. .............. 99/323 |
| 6,045,833 | A | * | 4/2000 | Landau .......................... 426/2 |
| 6,095,375 | A | * | 8/2000 | Adams et al. .............. 222/182 |
| 6,109,538 | A | * | 8/2000 | Villani et al. ................. 239/33 |
| 6,221,407 | B1 | * | 4/2001 | Gallart et al. ................. 426/91 |
| 6,221,416 | B1 | * | 4/2001 | Nohren, Jr. ................. 426/394 |
| 6,375,236 | B1 | * | 4/2002 | Ducharme ................... 294/1.1 |
| 6,517,878 | B2 | * | 2/2003 | Heczko ...................... 426/112 |
| 6,541,055 | B1 | * | 4/2003 | Luzenberg .................. 426/433 |
| 6,565,899 | B1 | * | 5/2003 | Cecere ........................ 426/85 |

FOREIGN PATENT DOCUMENTS

| | | | |
|---|---|---|---|
| GB | 2259241 | * | 3/1993 |
| GB | 2 322 283 | | 8/1998 |
| JP | 55-150856 | * | 11/1980 |

* cited by examiner

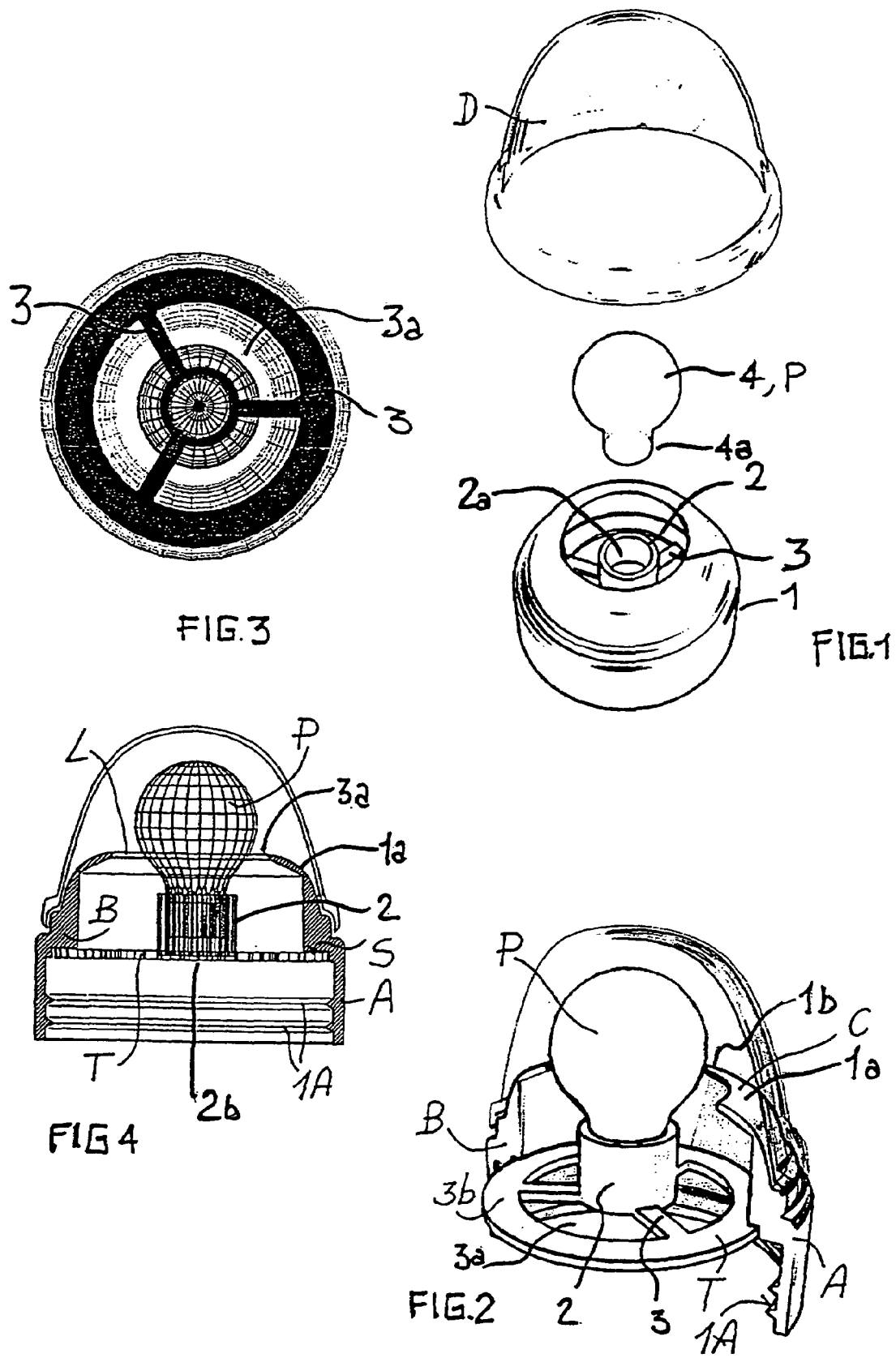

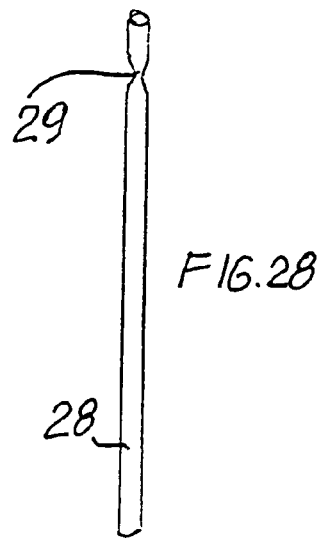
FIG. 28
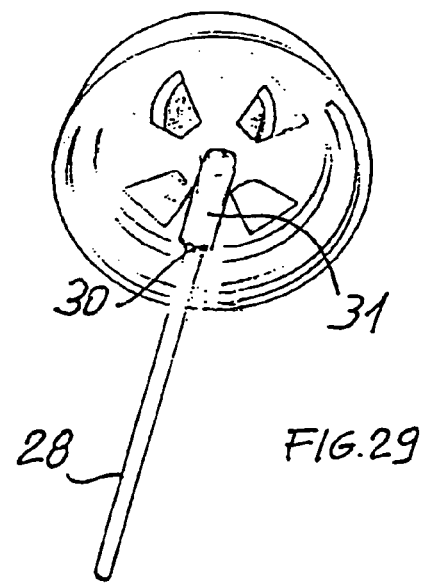
FIG. 29
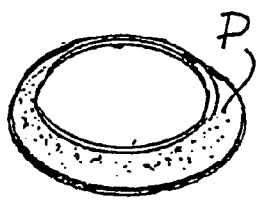
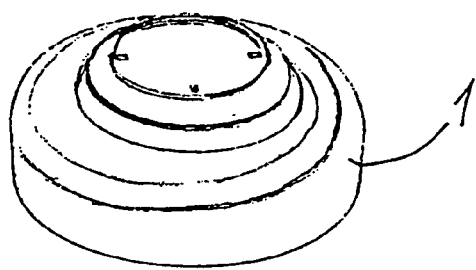
FIG. 10A
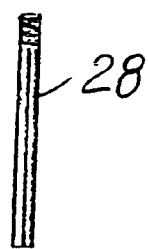
FIG. 30

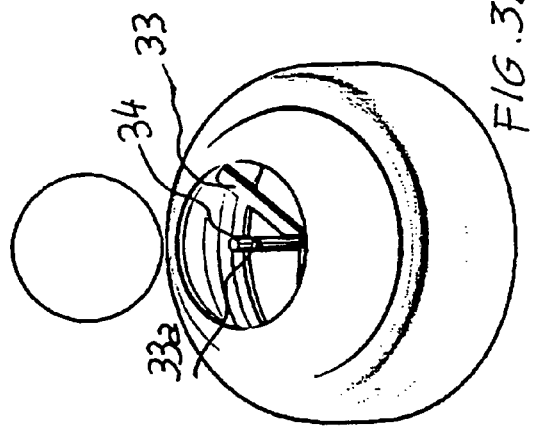
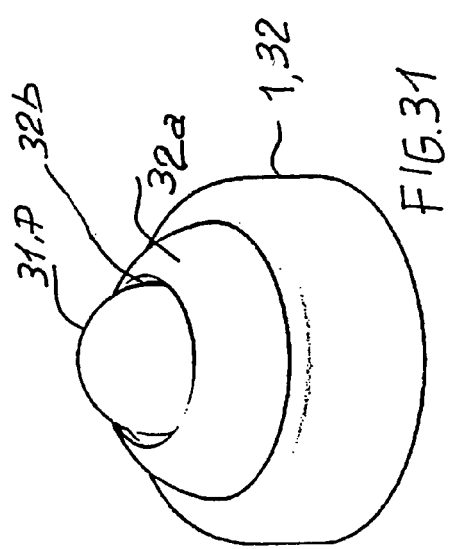
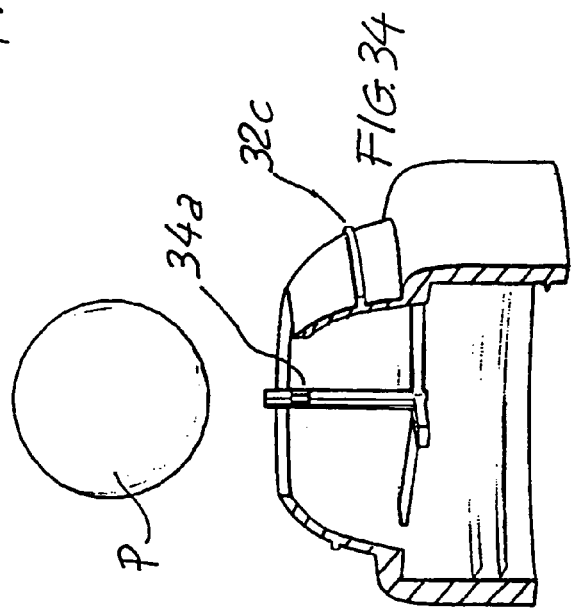
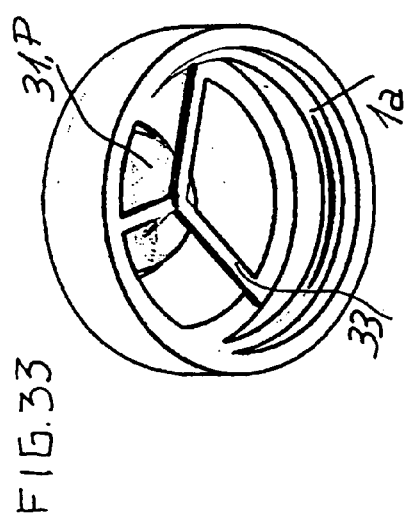
FIG.31
FIG.32
FIG.33
FIG.34

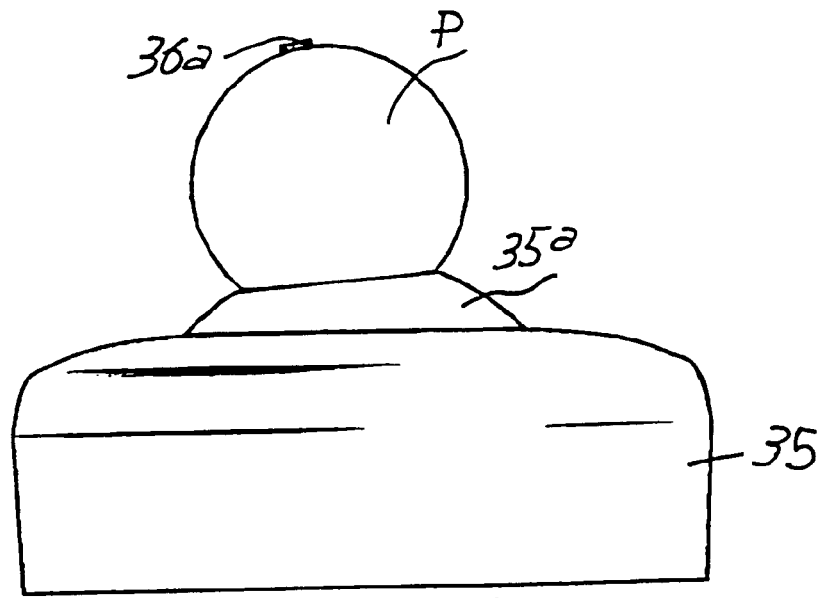
FIG. 35
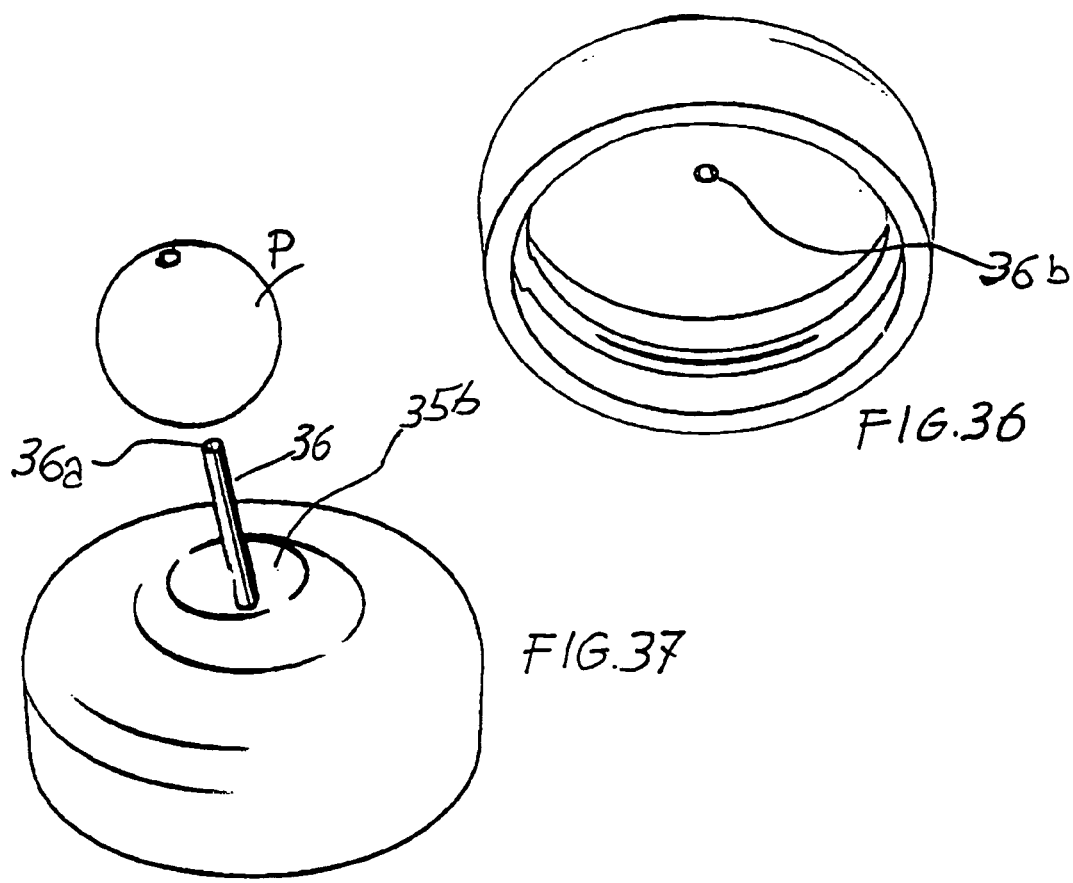
FIG. 36
FIG. 37

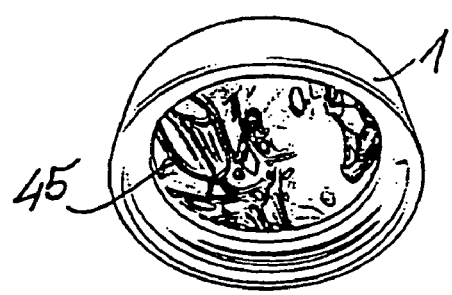
FIG.48
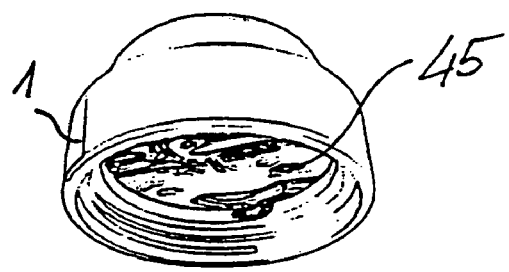
FIG.49
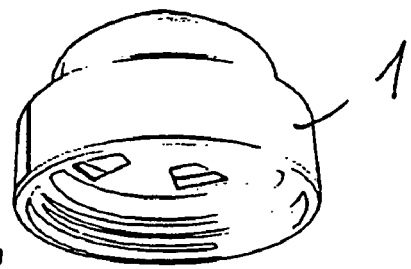
FIG.50

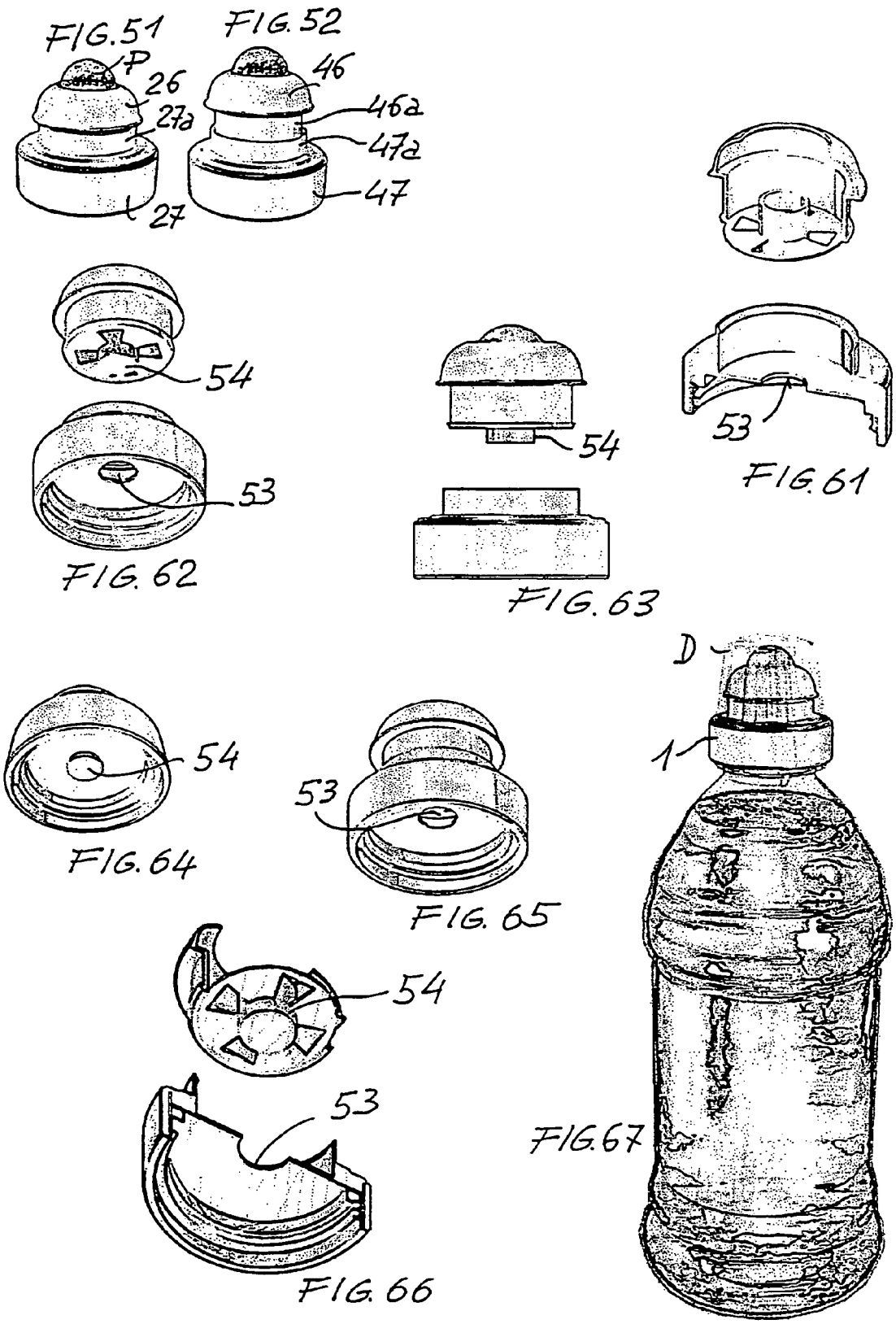

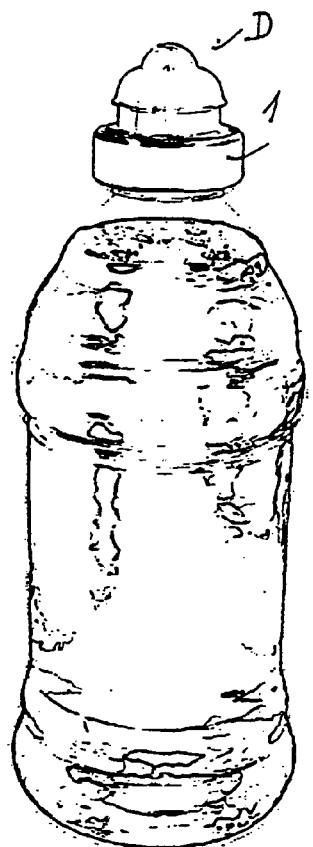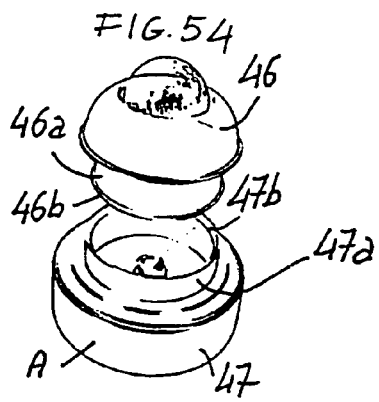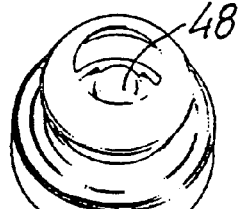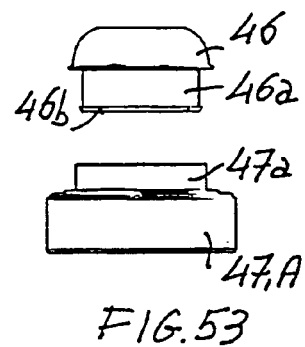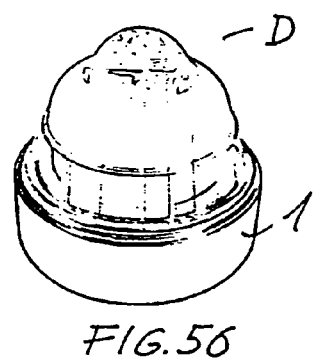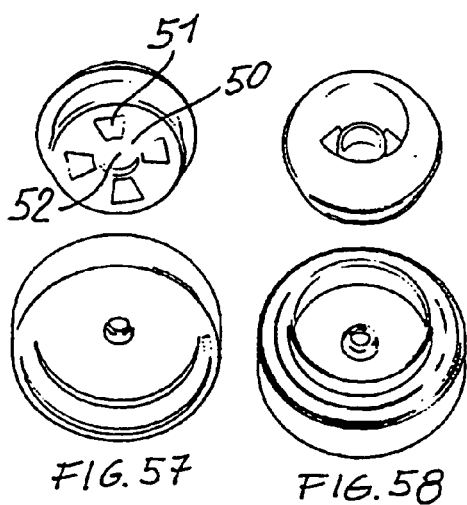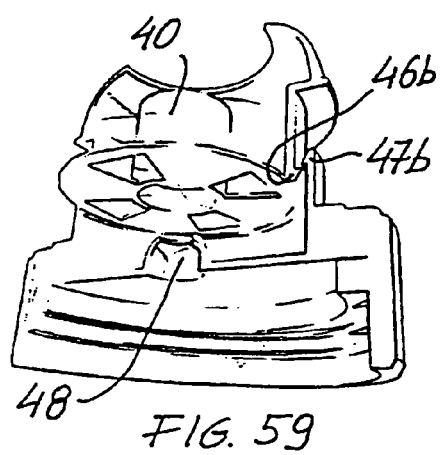

PLUG FOR SUCKING A BEVERAGE

BACKGROUND OF THE INVENTION

In the following disclosure the term "praline" will mean any types and shapes of food products, such as confectionery products, sweets, chocolates and so on, which are dissolved in the mouth by rubbing against the tongue, or by contact with the saliva, heat and so on.

The term "beverage" will mean any conventional beverages such as tea, milk, water, drinks, as well fruit juices and the like, and more viscous food products, such as cocoa based beverages, yoghurt and so on. The term "beverage" will moreover encompass liquids in which medicines, such as for children, are dissolved.

The document FR-A-1,288,957 discloses a vessel to be fixed to drink bottles. This vessel comprises two closable pieces, adapted to hold therebetween any desired food products, for example ice cream, said vessel being provided with an inlet nozzle which can be coupled to a bottle, and an outlet nozzle therefrom the beverage is delivered, upon mixing it with the ice cream, or the like, held inside the vessel. Thus, the dissolving of the ice cream into the beverage occurs outside of the user mouth and in a chamber which cannot be accessed by the user tongue.

The document U.S. Pat. No. 3,201,015 also discloses a vessel provided for mixing a liquid, held in a bottle, and a dissolvable food product held in said vessel, said vessel also comprising two portions. In this vessel too a recess is provided at one end thereof for coupling to a bottle, whereas the other end comprises a suction nozzle for sucking the beverage upon having mixed it with the dissolvable element held in the vessel.

The document WO-99/64323 teaches to improve the perception of a drink taste by aromatizing the plug of the bottle holding the drink beverage. Thus, the plug is so perfumed to affect the sense of smell as the beverage is drunk.

The re-issued US Patent (USOORE 35577E) discloses a cylinder-shaped supply device including at a bottom thereof a beverage which can be delivered by pressing on a piston. The delivered liquid exits through ducts traversing an outer sweet. In sucking the sweet, the lips do not encounter any bearing points, and the delivered liquid adjusting is manually controlled and cannot be affected by a rubbing movement of the tongue.

The document U.S. Pat. No. 5,370,884 discloses a support element for a hard sweet coupled to a powder or granular confectionery product vessel for providing children with a different taste.

The document U.S. Pat. No. 5,993,870 discloses a device for holding and coating a confectionery product having a handle. The addition of said substances being performed manually and outside the user mouth.

SUMMARY OF THE INVENTION

Thus, the aim of the present invention is to provide a plug for sucking a beverage allowing to efficiently progressively transfer the taste and nutritional components of a praline to a beverage licking said praline in a manner controlled and favored by the rubbing of the user's tongue thereon, or an immediate proximity of the user's lips and nose.

The plug according to the invention provides a lot of important advantages.

At first, the immediate proximity of the praline to the taste and smell members, with the beverage being directly sucked on the praline, affects in a direct and intensive manner said members, thereby improving the pleasure of tasting the mixture of the beverage and dissolved praline components.

A further advantage is that the dissolving rate of the praline components can be directly controlled by the user, directly controlling said praline by sucking, tongue rubbing and saliva dissolving operations as well as by the heat of his/her mouth cavity.

A further advantage is that the praline operates per se as a "conveyor" of the beverage to be drunk, thereby facilitating a large surface firm contact of the praline and the beverage licking it. This large contact surface, in combination with the tongue rubbing on the praline (which rubbing can be adjusted by the user directly affecting the praline) allows the user to adjust at will the dissolved component amount which can be transferred from the praline to the beverage. Thus, the user can directly adjust the praline dissolvable components released into the beverage, which operation is performed in the user's mouth and, accordingly, directly affects the sense of smell, thereby further increasing the related pleasure.

Yet another advantage is that the praline, operating as a beverage transfer member, can be indifferently fixedly or rotatably supported in the plug according to the invention, thereby providing further advantageous embodiments thereof.

The plugs according to the present invention, allows the user to obtain a large and natural ergonomics bearing of his/her lips on the inventive plug, thereby enhancing his/her pleasure, (for example as the user is a child), since in sucking the praline or drinking the beverage, he/she will pleasantly remember the maternal breast-feeding. In particular, if the plugs are fitted for a removable application to bottles or vials, this would likewise facilitate an easy taking of a medicines by children.

BRIEF DESCRIPTION OF THE DRAWINGS

Further characteristics, details and advantages of the plug according to the present invention will become more apparent hereinafter from the following disclosure of several embodiments of the plug according to the invention, which are illustrated, by way of an indicative example, in the accompanying drawings showing several perspective, cross-sectional, broken-away and exploded views or figures, which are not herein disclosed in any further details, since they would immediately intelligible from the drawings illustrating the following examples.

FIGS. 1–4 illustrate a first example of the inventive plug.

FIGS. 23–30 illustrate a seventh example of the inventive plug; FIGS. 31–34 illustrate an eighth example of the inventive plug; FIGS. 35–39 illustrate a ninth example of the inventive plug; FIGS. 40–50 illustrate a tenth example of the inventive plug; and FIGS. 51–67 illustrate further examples of the inventive plug.

EXAMPLE 1 (FIGS. 1–4)

Figure 5:
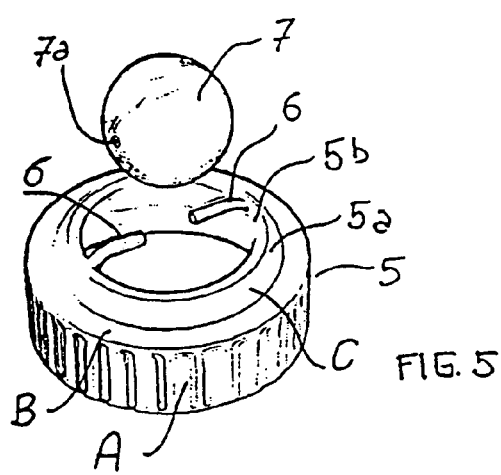
FIGS. 5–7 illustrate a second example of the inventive plug.

The plug 1 according to the present invention is herein made of any suitable materials, preferably a food product synthetic material, and substantially comprises a bottom fixing portion A, a middle portion B and a top contoured portion C. Inside the bottom portion A means for fixing the plug to a vessel, such as a bottle or vial are provided, said means comprising a continuous thread 1A, or a sector-thread such as a bayonet attachment or the like. Inside the middle portion B a seat or recess S, housing therein, for example by a snug engagement, supporting means T for supporting a praline P, for example a hard sweet is formed. The praline P housing means comprise a cylinder 2, in the inside 2a of which it is possible to snugly engage a portion 4a of the praline P. The reference 2b indicates the closed bottom of the cylinder 2. The supporting means T and housing means 2 advantageously consists of a single-piece insert. The praline P has a generically spherical configuration 4 having a diameter, for example, of about 18 mm.

The top portion C is rounded at 1a as a "teat", and comprises an opening 3a having such a diameter as to form, with said praline P, a circumferential port L, for example of 2–5 mm, thereby providing a desired delivery of the beverage, depending on the viscosity or density thereof, said port having a smaller cross-section for aqueous beverages such as tea and drinks, and a larger cross-section for more dense or less viscous beverages such as fruit juices, cocoa based beverages, yoghurt and the like.

In the shown example, the support means T comprise a plurality of radially extending arms 3 separated by openings 3a and joined by an outer crown 3b.

The reference D shows a covering, for example of a clear material, in the form of a cap, which covering can be resiliently fixed by removably snugly engaging it on the middle portion B of the plug 1, as shown in the figures.

As a user abuts his/her lips about the praline P and the top portion C of the plug 1, and tilts the bottle, the beverage passes through the openings 3a and circumferential port 1 to the tongue, while entraining therewith all the taste and nutritional components of the praline P. By rubbing the tongue with a desired force and time against the praline P, the dissolving rate of said praline into the beverage can be properly controlled. Actually, the ergonomics configuration of the top part C of the plug allows the user's lips to safely close on the plug, like a maternal breast suction. Simultaneously, the user can bear his/her lips on the plug 1 and praline P.

According to the invention, the bottom 2b of the housing means 2 can be provided with holes and the praline can be in turn provided with one or more throughgoing holes for allowing a liquid flow both through the bottom 2b and the praline. Thus, the beverage flow will be further facilitated, while eroding said praline with a greater speed.

Figure 6:
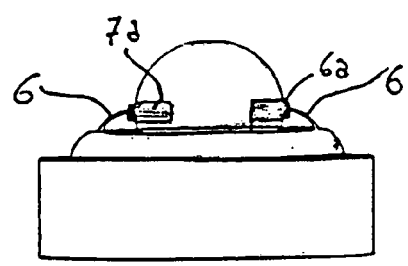
Figure 7:
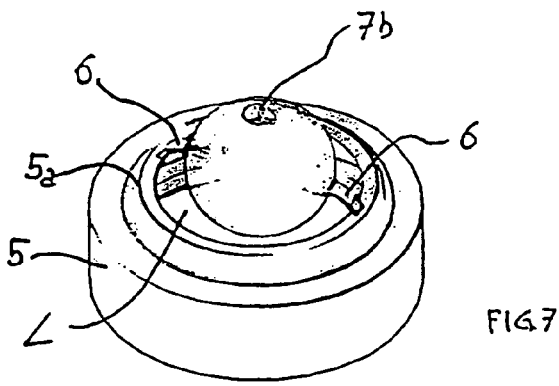

EXAMPLE 2 (FIGS. 5, 6 and 7)

In this first modified embodiment, the supporting and housing means define two diametrically opposite and coaxially extending arms 6. The praline 7 is correspondingly provided with two diametrically opposite holes 7a for receiving, at the respective end portions thereof, the arms 6. To that end, said arms 6 are sufficiently resilient, and the size whereof are so designed, to properly house said praline 7 while advantageously allowing said praline to be rotate thereon. The plug 5 is in turn provided with a top rounded portion 5a including an opening 5b defining, with said praline 7, the above mentioned beverage delivering perimetrical port 1. In this embodiment, a covering cap can be moreover provided, not specifically shown, as in Example 1. The reference number 6a shows the contoured portions formed as a single piece on the arms to facilitate a proper locating of the praline for use. Actually the sweet can be turned both by flowing beverage and by the user's tongue rubbing on the praline. The reference number 7b shows a throughgoing hole to allow the beverage to also flow through the praline 7. The rotation of the praline allows a uniform consumption or wearing thereof.

Figure 8:
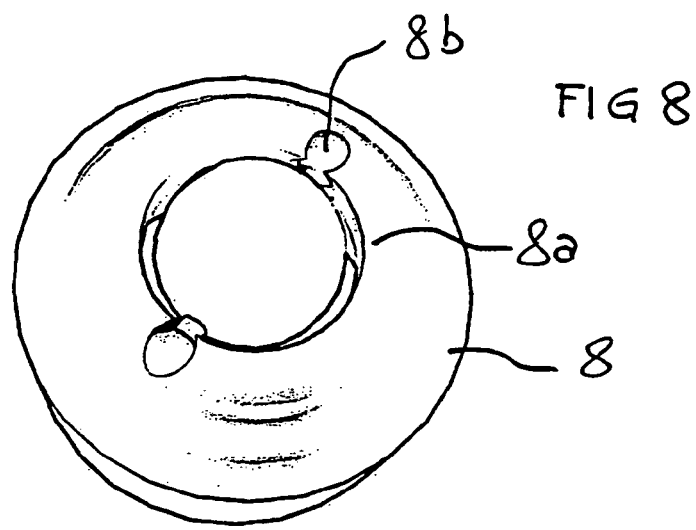
FIGS. 8–9 illustrate a third example of the inventive plug.
Figure 9:
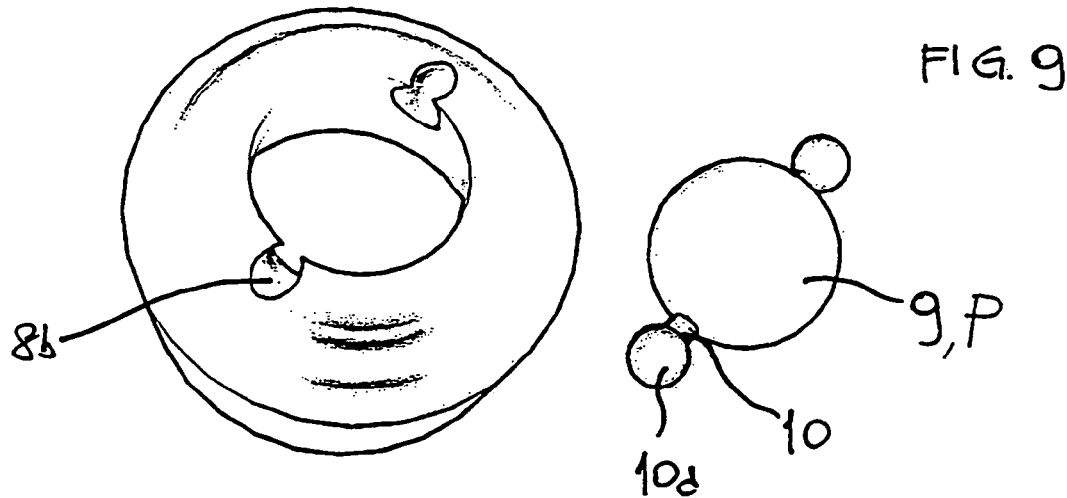

EXAMPLE 3 (FIGS. 8 and 9)

The praline 9 is arranged on a rod-like support element 10 ending with end enlarged portions 10a, for example of ball configuration, which can be engaged in corresponding seats 8b formed on the ergonomical rounded top portion 8a of the plug 8. The configuration of the enlarged portions 10a and seats 8b is so selected to assure a slightly resilient engaging of said enlarged portions or preventing the praline 9 from being accidentally disengaged from the plug 8. The rod-like element can also be formed as a detachable element, for example of telescopic configuration, to easily replace or change at will the praline 9.

The mixing of the components of the praline 9 and beverage is herein performed as disclosed for the embodiment shown in FIGS. 5–7.

EXAMPLE 4 (FIGS. 10, 12)

In this example, the housing means comprise a cylindric flat seat 2, of small depth, provided with a central opening 14 for allowing the beverage to flow therethrough. The supporting means comprise a plurality of pins or pegs 12, of which, in the disclosed embodiment, three pins or pegs are shown. For the remaining portion, the plug 16 has a configuration analogous to that of the previous examples. The praline 13 is provided with a throughgoing vertical hole 13a. With the praline 13 in its assembled condition, the throughgoing hole 13a and hole 14 will be coaxial to one another. With a soft type of pralines 13, they must be fixed by pressing them on the pins 12. With hard pralines, on the other hand, they could include small holes for facilitating their application.

Figure 10:
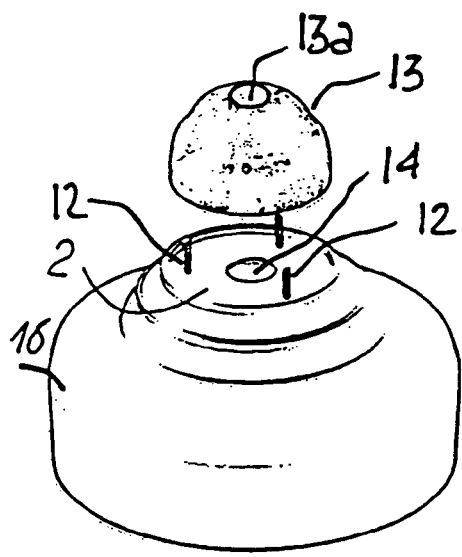
FIGS. 10 and 12 illustrate a fourth example of the inventive plug.
Figure 11:
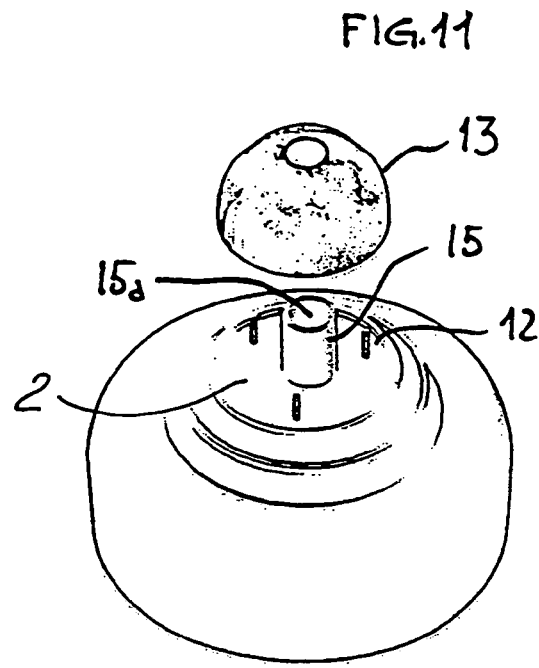
FIGS. 11 and 13 illustrate a fifth example of the inventive plug.
Figure 12:
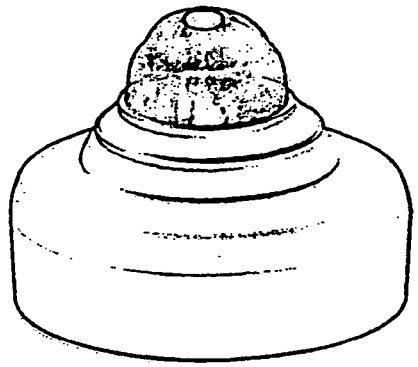
Figure 13:
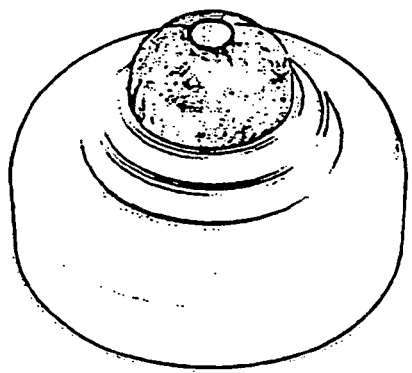

The plugs shown in FIGS. 10 and 12 are also adapted to house therein both a ring-like praline, for example of a jelly/rubber type, FIG. 10A. Further it could optionally be possible to provide a second internal praline, not shown. In this case, the contoured top portion of the plug housing the ring-like praline would have a smaller size, e.g. an outer diameter of about 18–20 mm.

EXAMPLE 5 (FIGS. 11, 13)

This fifth modified embodiment is directly derived from the example of FIGS. 10 and 12. In the housing seat 2 a small cylinder 15, having a throughgoing hole 15a, and made as a single-piece with the plug 16 is provided. The praline 13 being engaged in said hole 15a of said cylinder 15. For firmly coupling the praline pin or peg elements 12 moreover are provided. In this embodiment, a less contact between the beverage and praline occurs, thereby the praline will be eroded in a less degree.

Figure 14:
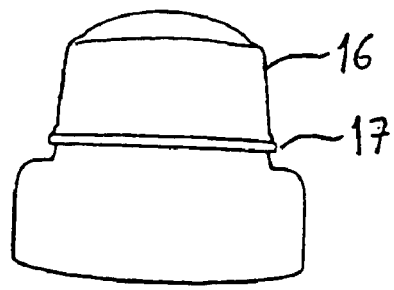
FIGS 14 and 14a show a front elevation view.
Figure 14A:
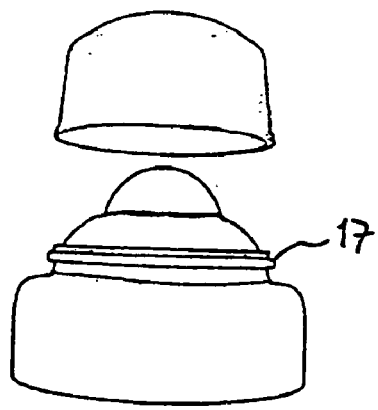

FIGS. 14 and 14a respectively show a front elevation view and an exploded view of a plug 1 having a hygienic covering cap 16 with a coupling contour 17 slightly different from that shown in the Example 1 figures.

Figure 15:
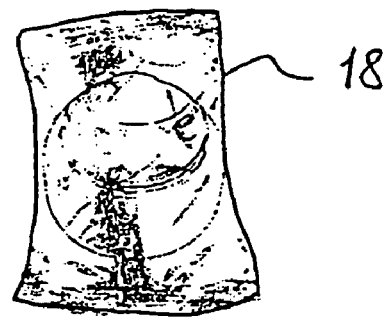
FIG. 15 shows a plug with a praline and covering cap.

FIG. 15 shows a plug with a praline and covering cap in a package consisting of a plastics pouch. Thus, the user can affix by himself/herself the plug on a bottle or the like, holding any desired beverage, and apply on the bottle a praline having any freely selectable tastes.

Figure 16:
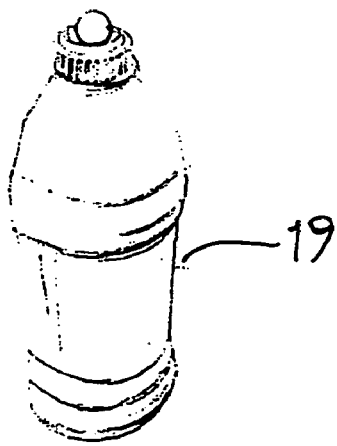
FIG. 16 shows a perspective view.

FIG. 16 is a perspective view showing the plug according to the invention mounted on a bottle-like vessel, a can vessel 19 or the like.

EXAMPLE 6 (FIGS. 17, 18)

In this sixth modified embodiment, the plug 21 is formed with a housing hole 22 for receiving a small rod 20 supporting at the top thereof a praline 13. The reference number 20*b* shows indicates the bottom end of the axially perforated rod 20, whereas 13*a* shows the hole of the praline 13. A firm support of the praline 13 is herein assured by forced-coupling means, for example notches or ribs, not shown. A firm tight engaging of the rod 20 in the hole 22 being likewise obtained by engraving the rod 20 outside, or by any other suitable coupling means.

Figure 17:
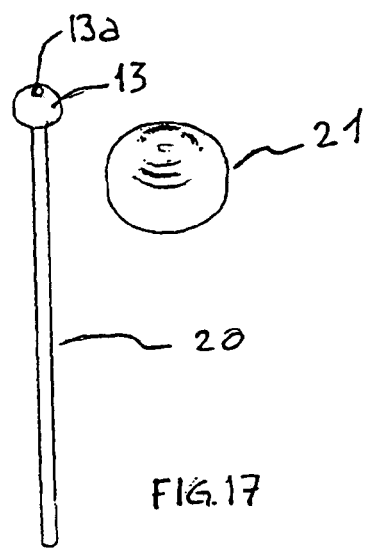
FIGS. 17, 18 illustrate a sixth example of the inventive plug.
Figure 18:
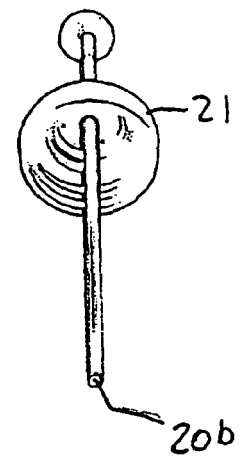
Figure 21:
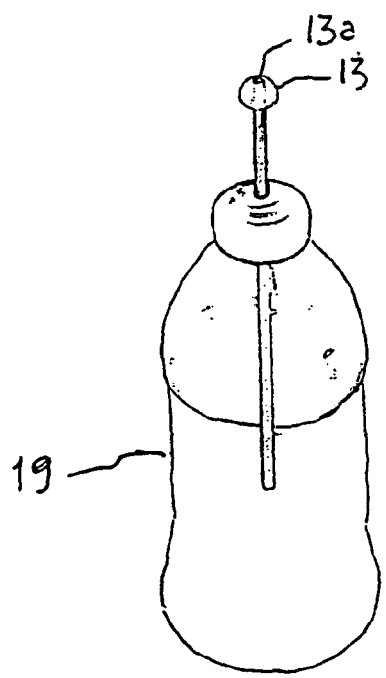
FIGS. 21 and 22 respectively show a bottle having a plug and praline according to FIGS. 17 and 18.
Figure 22:
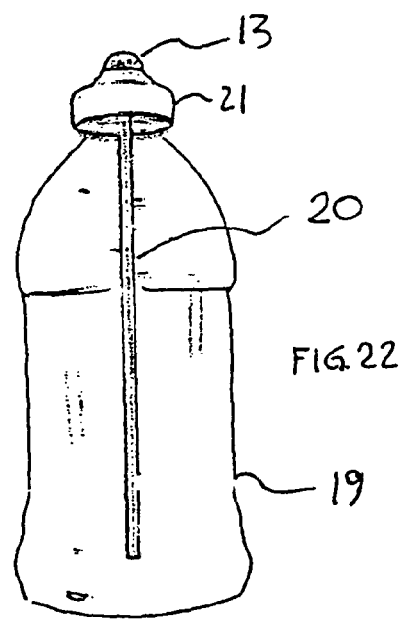
Figure 23:
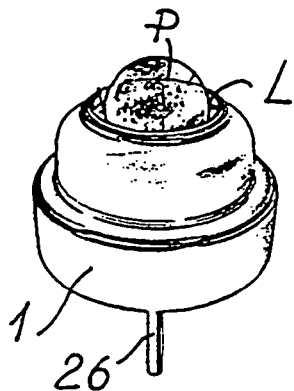
Figure 24:
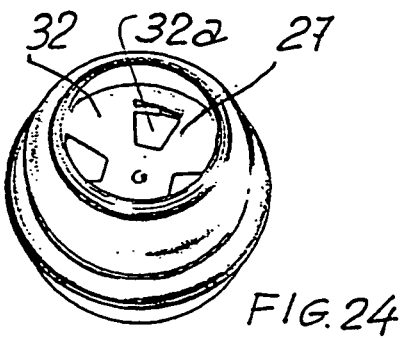
Figure 25:
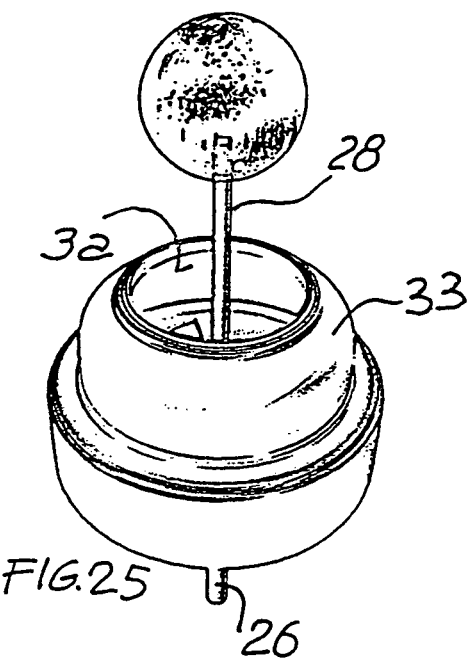
Figure 26:
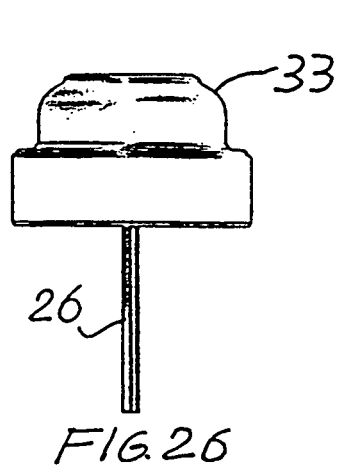

FIGS. 21 and 22 respectively show a bottle having a plug and praline according to FIGS. 17 and 18.

In this embodiment, it would be possible to loosely sell different-taste pralines and related rods, for example in a blister-type of package, thereby allowing the user to select the desired taste praline.

Figure 19:
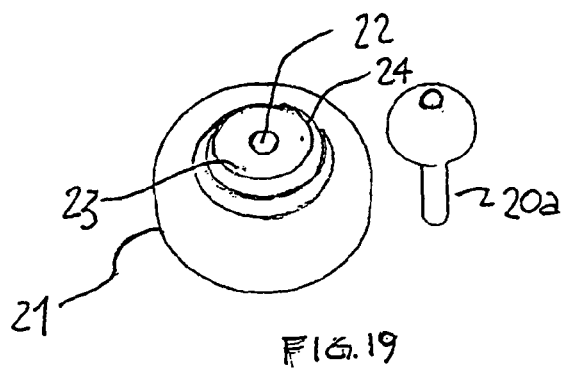
FIGS. 19 and 20 show a shorter length rod.
Figure 20:
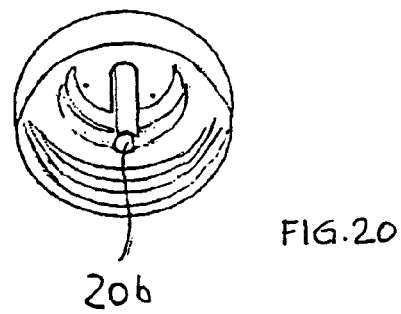

According to the invention, the rod 20 may have a shorter length, as shown, for example, in FIGS. 19 and 20.

EXAMPLE 7 (FIGS. 23 TO 27)

The shown modified embodiment also allows to use pralines P or 25 which are fitted onto a supporting stem or stick 28, like the known lollipops. In this case, the plug 1 is provided with an inner diaphragm 27 including a plurality of windows 32 as well as preferably—for hygienic and positioning purposes—and a hollow cylindrical lug 26, of tube shape, downward projecting for supporting housing and supporting the praline stick 28.

Preferably, said hollow cylinder lug 26 includes a seat or recess 29, allowing, upon exhausting the beverage, to further leak the remaining praline, upon removing it from the vessel. To that end, the user must press said hollow cylinder to break away the plug 1 therefrom.

To achieve this, said cylindrical lug is perforated at the bottom thereof, as shown by 30, and has a length 31 less than that of the praline 25 supporting stick 28.

The reference number 33 shows again the rounded anatomic configuration for bearing the user's lips thereon, whereas 3*a* shows the opening defining, with the praline 25, the circumferential delivery port L.

In operation, the user will mount said praline or "lollipop" with its stick on the plug through the hole 27 of the slitted diaphragm 32, and then will drink the beverage flowing through the windows 32*a* of the diaphragm 32. Upon exhausting the beverage, the user can consume at will the praline, or mount it on another bottle.

Figure 27:
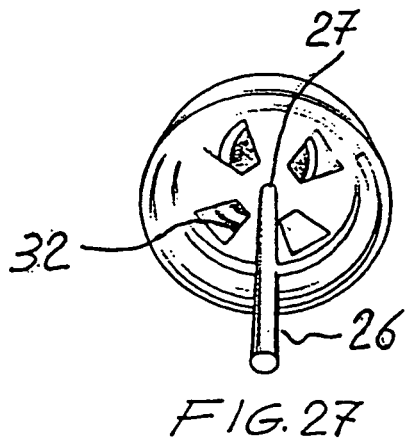

FIG. 30 shows an embodiment modified from that of Example 7, FIG. 27, specifically designed for a lollipop, in which the cane lug 26 is provided for removably connection to the bottom diaphragm of the plug, for example by screw means. In operation, the user will engage the lollipop stick in the cane lug and then will break away said stick to the desired length to properly locate the praline on the plug. Upon exhausting the beverage, will detach from the plug the hygienic protective and stick locating lug and disengage the stick from the lug to fully consume the praline in a conventional manner.

In a further simplified embodiment, not shown, the plug can be merely provided with a hole for the lollipop stick and circumferential rod-like lugs for proper a locating the stick.

EXAMPLE 8 (FIGS. 31, 32, 33)

The plug 32 has a bottom portion A, a middle portion B and a top portion C which is anatomically rounded like a "teat", for an easy and proper application of the lips, as the plug 1 of the first embodiment. The praline P supporting means comprise a peg 34 formed as a single piece on the supporting arms 33, in turn formed as a single piece with the body of the plug 32 or with a disc-like diaphragm, as in Example 1. The reference number 34*a* shows notches, ribs or the like, provided for firmly and tightly coupling the praline P on the peg 34, which coupling, in particular, can be performed by a simple pressure application, e.g. for a chocolate praline, which can be pre-heated, or a hard praline, of a sweet type, said pralines including therein a coupling blind hole, not shown.

As is shown in FIG. 33, between the coupling means 1*a*, for coupling the praline to a bottle or the like, and said arms 33, a set spacing is provided, for optionally engaging therein a removable separating hygienic diaphragm, for example of an aluminium, polyethylene or the like sheet, not shown.

Figure 34A:
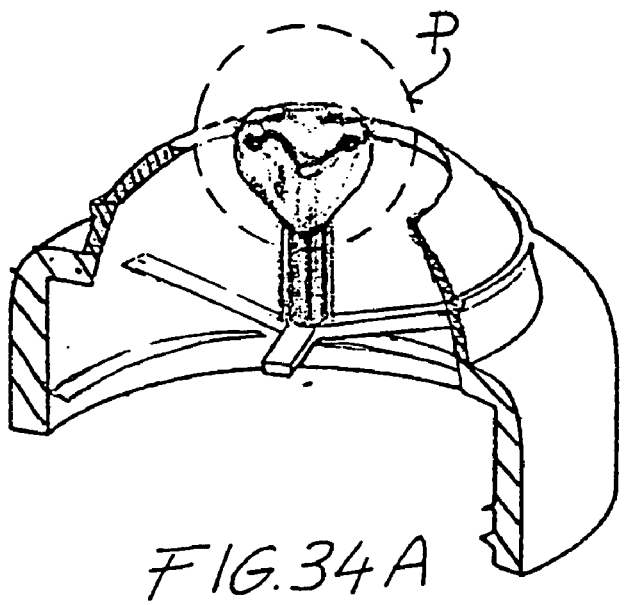
Figure 40:
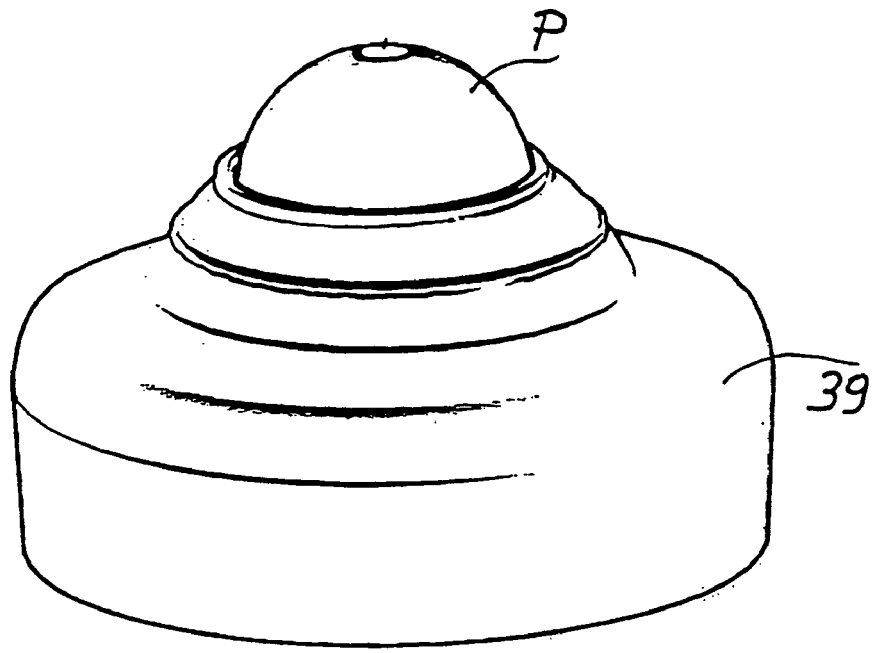
Figure 41:
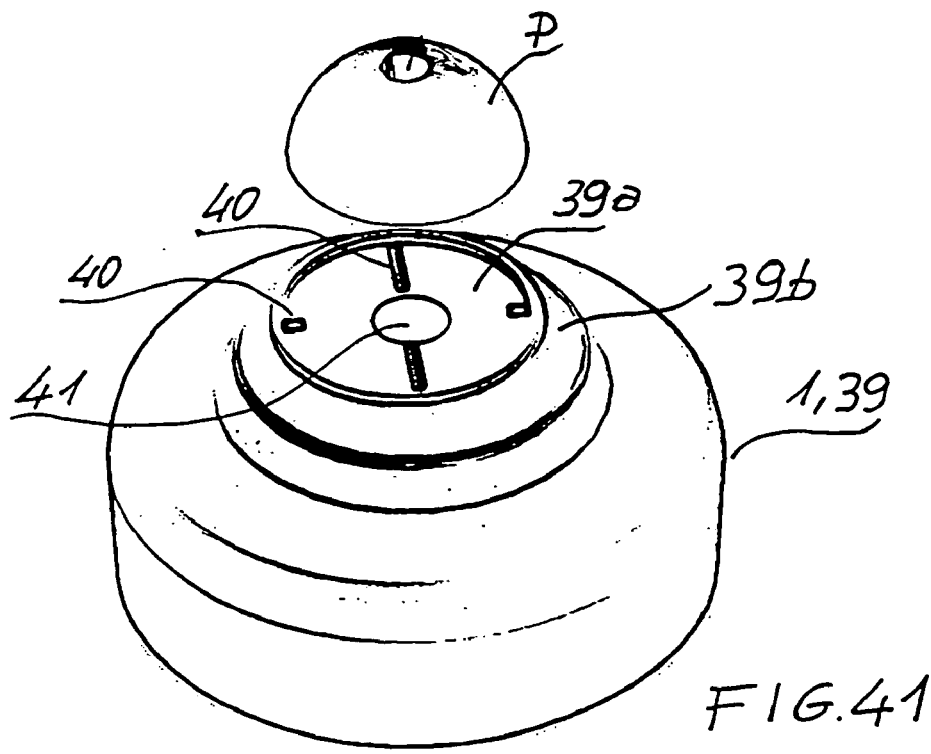
Figure 42:
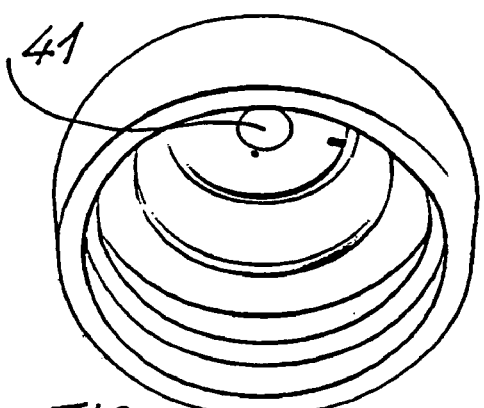
Figure 43:
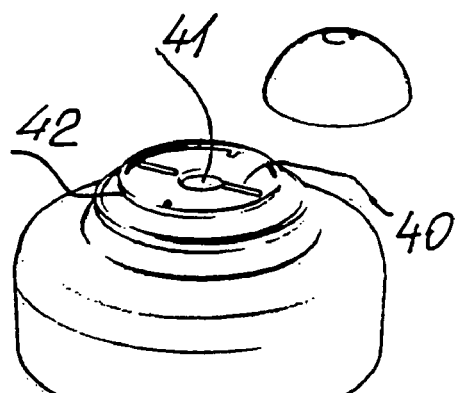
Figure 44:
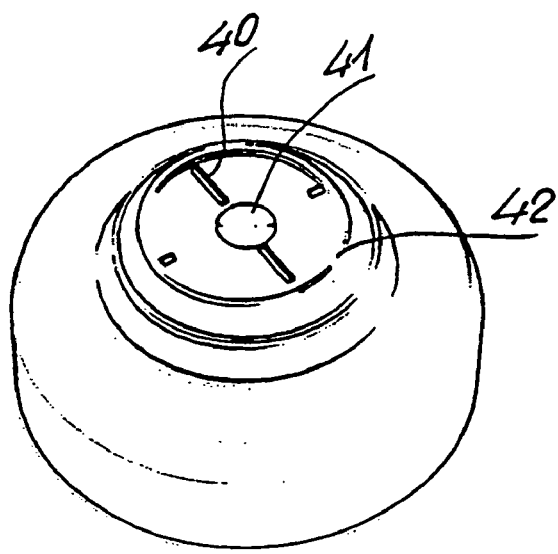

In a further modified embodiment of the Example 8 plugs the top portion of the peg supporting element is patterned to a puppet, flower or the like configuration (FIG. 34A), thereby, upon exhausting the praline, the user can bear his/her tongue on a more rounded peg. Said plugs, in particular, could also be collected. Said peg is preferably provided removable, for example by means of a screw engagement, in order to allow to eat separately the praline when the beverage is drunk up. The same result may be achieved by providing the upper plug part C removable from the plugbody. Furthermore, by providing a transparent praline on said profiled pegs it is possible to achieve a pleasant chromatic effect and see the configuration of the internal peg.

EXAMPLE 9 (FIGS. 35 to 39)

In this ninth embodiment, the praline supporting means comprise a peg 36 projecting from the top portion C of the plug 35. The peg 36 is hollow, and has end openings shown by 36*a* and 36*b*. The praline P housing means comprise a small-depth hollow recess 35*b*, formed on a top enlarged portion 35*a*. The peg 36 is preferably tilted, thereby facilitating the gripping of the bottles by the user for drinking the beverage. Also in this case, the peg 36 can comprise firm-coupling means, such as notches, ribs or the like, and the praline P can include a throughgoing hole, as shown.

Figure 38:
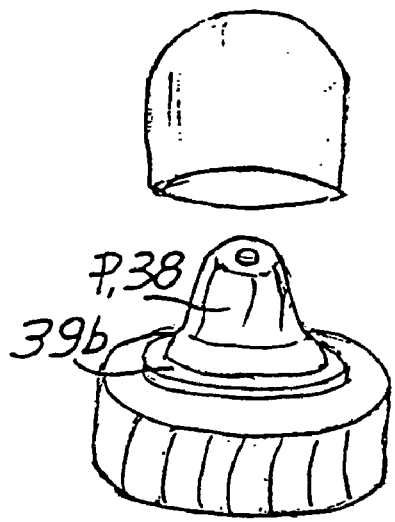
Figure 39:
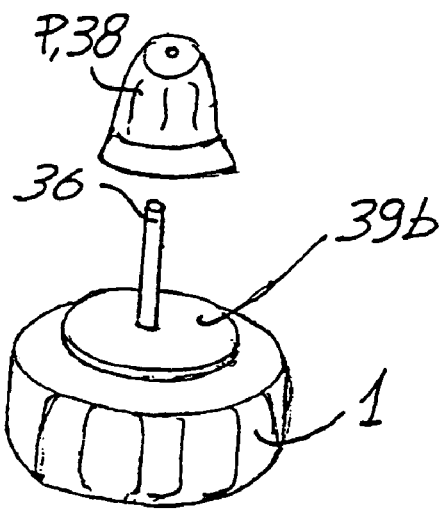

FIGS. 38 and 39 show a vertically extending peg 36, and the praline P housing means can comprise a disc-like element 39*b*.

In the embodiments including supporting means formed as projecting hollow pegs, the praline P could have, as it would be obvious, a broader range of possible configurations. For example, as shown in FIGS. 38 and 39, the praline P can have a bell shape, thereby providing optimum ergonomics characteristics for the user's lip engagement.

In order to avoid an obstruction of the hollow peg by the praline fitted thereon, according to the present invention inside the cover D is can be provided an integrally molded central pin projecting along the cover center line.

EXAMPLE 10 (FIGS. 40 to 44)

This tenth embodiment is similar to the fifth embodiment, since the housing means comprise a top circular flat seat 39a, of small depth, having a central hole 42. The praline P supporting means are shown by 40 and 42 and comprise projecting strip portions having different length.

Figure 46:
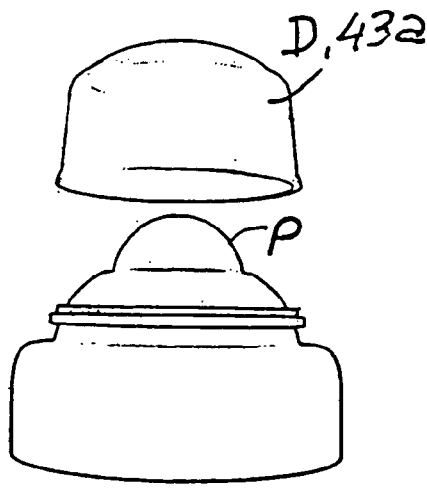
Figure 45:
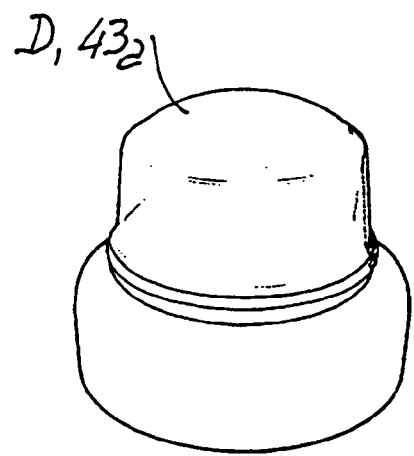

The plug 39 comprises, also in this embodiment, the three inventive portions, i.e. a bottom portion A, a middle portion B and an ergonomical contoured top portion C. In FIGS. 45 and 46, the plug is provided with an easily removable covering cap 11.

Figure 47A:
Figure 47:
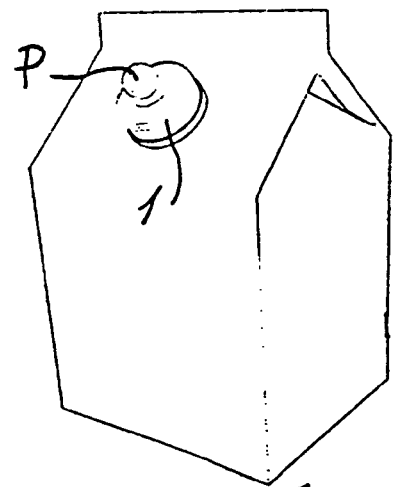
Figure 46A:
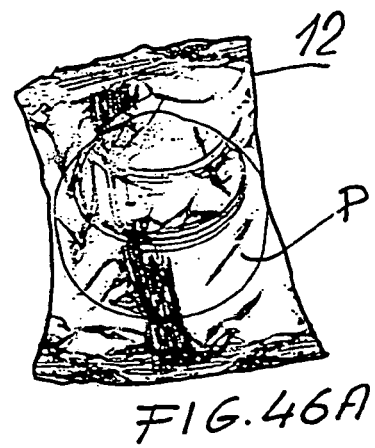

The plug, praline and protective cap assembly could be individually sold, for example in a plastics material pouch or blister, as shown in FIG. 46A. FIGS. 47 and 47A shows a plug respectively applied to a Tetrapack® type of package, or "box", and on a bottle.

In the plug according to this tenth embodiment, a hygienic separating diaphragm 45, e.g. an aluminium membrane, a synthetic material film, e.g. of a heat sealable material, to be pressure or snap applied, as shown in FIGS. 48–50 could also be provided.

FURTHER EMBODIMENTS (FIGS. 51 to 67)

If the user desires to drink the beverage not continuously, but by portions, thus to prevent, because of a slant or reverse arrangement of the bottle, any undesired leaks of liquid and dissolving of the praline due to a continuous contact of the praline with liquid, telescopic types of plugs could be used. In particular, such a plug would substantially comprise two half-plugs to be mutually telescopically coupled (FIGS. 51–53) of which the top half-plug would house the praline and would be provided, at the bottom thereof, in a windowed diaphragm, with a solid region closing an opening through a diaphragm of the bottom half-plug, as the two half-plugs are abutted against one another, said opening allowing the beverage to flow therethrough upon separating the half-plugs.

A first example of such "telescopic" plug is shown in FIGS. 54–59. At the bottom of the top half-plug 46, which, for example, is made as the plug shown in FIG. 2, is provided, as a single-piece, a lug 46a having the shape of a cylindric sleeve with a slightly projecting and beveled bottom edge 46b, thereby it can be easily inserted and removed into/from the bottom half-plug 47, which will include include a cylindrical sleeve 47a having a upturned edge 47b near its free end, and, at the bottom, a portion A will in its inside the coupling means for coupling the plug to a bottle, box or the like. In this example, on a bottom closed diaphragm 58, FIG. 59 is arranged a cylindrical lug 48A having a throughgoing hole, the opening of which bears against a corresponding wall portion 52 of the top half-plug 46, as shown in FIG. 59, the half-plugs 46 and 47 being shown spaced from one another, i.e. in their beverage delivering condition. In operation, a very good opening/closing of the plug has been obtained with an opening/closing stroke of the order of about ⅜ mm, preferably about 6 mm. By lowering the top half-plug 46 against the bottom half-plug 47, the solid wall portion 52 of the top half-plug 46 will abut against the opening of the cylindrical lug 48A of the bottom half-plug 47, thereby shutting off the beverage delivery even with the bottle arranged in a slanted or reversed position. The maximum withdrawn position of the top half-plug 46 being defined by the engagement of the contoured ribs 46b and 47b of the half-plugs 46 and 47. The assembling of the cylindrical sleeves 46a and 47a can be easily carried out owing to the resilient properties of the plastic materials of the half-plugs 46 and 47.

In the example shown in FIGS. 62–66, through the closing wall of the bottom half-plug 47 a hole 53, which can be closed by a corresponding cylindrical or frustum lug 54 arranged on the top half-plug 46 is formed.

Further constructional details and geometric patterns of the opening/closing portions of said half-plugs can be easily deduced from the drawings.

From the above constructional and operating disclosure of the plugs according to the present invention, it should be clearly apparent that they efficiently achieve the aim of the invention, and further allow to obtain the mentioned advantages.

In practicing the invention, the features of the embodiments of the invention herein disclosed can be combined at will to provide yet other inventive plugs.

With respect to the composition of the pralines, which can be loosely selected as a confectionery product, sweet, chocolate and the like, it would be further possible, and this would come within the invention scope, to provide pralines enhanced by vitamin and energetic components as desired, as well as pralines holding therein liquids of benefical or stimulating properties (for example ginseng extracts) which will be selected as the praline is progressively dissolved.

As shown in the drawings, in all the modified embodiments of the invention, the user will apply his/her lips directly on the praline and, in a less or larger amount on the plug, depending on the arrangement of the praline in the plug, which, together with the delivery of the beverage through a circumferential port adjoining the praline and/or through one or more throughgoing holes formed in said praline, and the ergonomics top pattern of the "teat" like plug, would provide a novel drinking "technique" with a strong symbolic-freudian antistress and ludic component, remembering a matern breast feeding. This would pleasantly attract children, from a side, and, in cooperation with the geometric pattern of the praline/plug top portion, would provide an easy and desirable dissolving into the beverage of the praline components, which can be easily controlled by the child licking/sucking the praline as he/she sucks the drink.

Advantageously, the praline can also include liquids, as well as components, such as iron, zinc and the like supplying compounds and substances, not per-se included in the beverage, thereby the plug-praline assemblies according to the invention will allow a novel, easy and pleasant sucking of these components too.

Moreover, since the plugs can be removably coupled to bottles, boxes and the like, it is also possible to easily add to the drinks additional components such as medicines, for an easy administration to children.

Further modified embodiments of the inventive plugs, made by combining at will the different characteristics of the praline housing and supporting means disclosed in the preceding examples, would also come within the scope of the invention.

While the fixing means for coupling the plug to bottles, boxes and the like have been merely shown as thread and bayonet connections, it would come within the invention scope to provide any other technical equivalents thereof, both of a removable and a fixed type. For example, said fixing means can also be provided for inserting the plug inside a bottle mouth or neck. In particular, the food compatible synthetic material for making the plugs can preferably be a clear plastic material.

The invention claimed is:

1. A drinking vessel attachment, comprising:
a bottom portion (A);
a middle portion (B);
a contoured top portion (C) with an opening presenting a profiled curved rim;
a dissolvable solid food product extending through the opening so as to be located both within the top portion and externally through the opening and outside of the top portion;
a fixing part, for fixing the bottom portion to a beverage vessel, located inside the bottom portion;
a seat (S) located inside the middle portion;
a support element (T) within the seat;
a rod (34) extending from the support element and, at a distal end thereof, supporting the food product; and
a passage located intermediate the opening and the food product, the passage sized to allow a fluid from within the vessel to pass through the passage, wherein,
a user of the drinking vessel attachment can suck a fluid from the vessel via the passage,
the top portion and said dissolvable food product which extends beyond said rim through the opening are sized and shaped relative to each other such that the user's lips can be placed on the top portion and liquid drawn past at the same time the solid is exposed to the tongue, and
the profiled curved rim directs a flow of the sucked fluid toward and over the food product to transfer a taste and nutritional components of the food product to the fluid at the same time the user's tongue has a free and direct access to the food product,
the food product is external exposed sufficient to allow the user to lick the food product by rubbing the user's tongue or lips over the food product, and
the bottom portion, the middle portion, the top portion, the fixing part, the seat, the support element, and the rod are of a single-piece construction.

2. The plug of claim 1, wherein,
the fixing part comprises a continuous thread (1A),
the food product is a candy,
the fluid is a beverage,
the rod is solid and free of any passage, and
the vessel is one of a bottle and a vial.

3. The drinking vessel attachment of claim 1, wherein,
the fixing part comprises a sector-thread (1A),
the food product is a candy,
the fluid is a beverage,
the rod is solid and free of any passage, and
the vessel is one of a bottle and a vial.

4. The drinking vessel attachment of claim 3, wherein,
the thread is a bayonet attachment,
the candy is a transparent praline, and
the vessel is a bottle.

5. The drinking vessel attachment of claim 1, wherein, the bottom, middle, and top portions together form a push-pull configuration.

6. The drinking vessel attachment of claim 1, wherein,
the food product is a solid praline with a spherical form having a diameter of about 18 mm, and
the vessel is a bottle.

7. The drinking vessel attachment of claim 1, wherein, the bottom, middle, and top portions together with the food product form a teat shape.

8. The drinking vessel attachment of claim 7, wherein, the opening is a circumferential port (L) of 2–5 mm.

9. The drinking vessel attachment of claim 7, wherein, the support element comprises a i) circular outer crown ring (3b) engaged in the seat and ii) a plurality of radially extending arms (33) separated by openings (3a) joining the rod to the ring.

10. The plug of claim 7, further comprising:
a circular rib (32c) on an exterior surface of the middle portion; and
an overall covering cap (D) removably engaging with the rib or the middle portion and covering the food product and an exterior surface of the top portion when engaged with the rib of the middle portion.

11. The drinking vessel attachment of claim 10, wherein, the cap is clear.

12. The drinking vessel attachment of claim 1, wherein, the rod is a peg with one of notches and nibs (34a),
the food product is a praline tightly fixed to the peg via the one of notches and nibs.

13. The drinking vessel attachment of claim 1, further comprising:
a hygienic diaphragm (45) removably adhered to the support element.

14. The drinking vessel attachment of claim 13, wherein, the diaphragm is comprised of one of aluminum and polyethylene.

15. The drinking vessel attachment of claim 1, wherein, the distal end of the rod is shaped as one of a puppet and a flower.

16. A drinking vessel attachment, comprising:
a bottom portion (A);
a middle portion (B);
a contoured top portion (C) with an opening presenting a profiled curved rim;
a dissolvable solid food product extending through the opening so as to be located both within the top portion and externally through the opening and outside of the top portion;
a fixing part, for fixing the bottom portion to a beverage vessel, located inside the bottom portion;
a seat (S) located inside the middle portion;
a support element (T) engaged within the seat;
a rod (34) extending from the support element and, at a distal end thereof, supporting the food product; and
a passage located intermediate the opening and the food product, the passage sized to allow a fluid from within the vessel to pass through the passage,
wherein,
a user of the drinking vessel attachment can suck a fluid from the vessel via the passage,
the top portion and said dissolvable food product which extends beyond said rim through the opening are sized and shaped relative to each other such that the user's lips can be placed on the top portion and liquid drawn past at the same time the solid is exposed to the tongue, and
the profiled curved rim directs a flow of the sucked fluid toward the food product to transfer a taste and nutritional components of the food product to the fluid at the same time the user's tongue has a free and direct access to the food product, and
the food product is external exposed sufficient to allow the user to lick the food product by rubbing the user's tongue or lips over the food product.

17. The drinking vessel attachment of claim 16, wherein, the distal end of the rod is shaped as one of a puppet and a flower.

18. The drinking vessel attachment of claim 17, wherein, the rod is removable from the support element by unscrewing.

19. The drinking vessel attachment of claim 16, wherein, the rod is removable from the support element by unscrewing therefrom.

20. The drinking vessel attachment of claim 16, wherein, the food product is transparent.

* * * * *